United States Patent [19]
Seppa

[11] Patent Number: 5,559,430
[45] Date of Patent: Sep. 24, 1996

[54] NET RADIATION SENSOR

[76] Inventor: Tapani O. Seppa, 39 N. Valley Rd., Ridgefield, Conn. 06897

[21] Appl. No.: 280,995

[22] Filed: Jul. 27, 1994

[51] Int. Cl.⁶ .............................. G01R 1/00; G01N 25/00
[52] U.S. Cl. .......................... 324/158.1; 324/106; 374/45
[58] Field of Search ....................... 73/862.391; 324/106, 324/127, 126, 158.1; 374/45; 340/870.17; 364/578; 395/500

[56] References Cited

U.S. PATENT DOCUMENTS

| 3,633,191 | 1/1972 | Engelhardt et al. | 340/870.17 |
|---|---|---|---|
| 3,748,655 | 7/1973 | Engelhardt et al. | 340/870.17 |
| 4,553,092 | 11/1985 | Porues | 324/106 |
| 4,723,220 | 2/1988 | Smith-Vaniz | 340/870.17 |
| 4,728,887 | 3/1988 | Davis | 340/870.17 |
| 4,801,937 | 1/1989 | Fernandes | 340/870.17 |
| 4,806,855 | 2/1989 | Davis | 324/127 |
| 4,886,980 | 12/1989 | Fernandes et al. | 324/126 |
| 5,006,846 | 4/1991 | Granville et al. | 324/126 |
| 5,140,257 | 8/1992 | Davis | 324/106 |
| 5,181,026 | 1/1993 | Granville | 340/870.17 |
| 5,341,088 | 8/1994 | Davis | 324/106 |

Primary Examiner—Ernest F. Karlsen
Assistant Examiner—Russell M. Kobert
Attorney, Agent, or Firm—Edward R. Hyde

[57] ABSTRACT

A system for determining the sag of an overhead power transmission line to prevent flashover to adjacent objects on earth. A small replica of the transmission line conductor is provided and located in proximity to the transmission line. The temperature of the replica is measured along with the ambient temperature. By appropriate calculations, the ampacity determination is made to determine the maximum permitted current through the transmission line under the particular weather conditions.

7 Claims, 2 Drawing Sheets

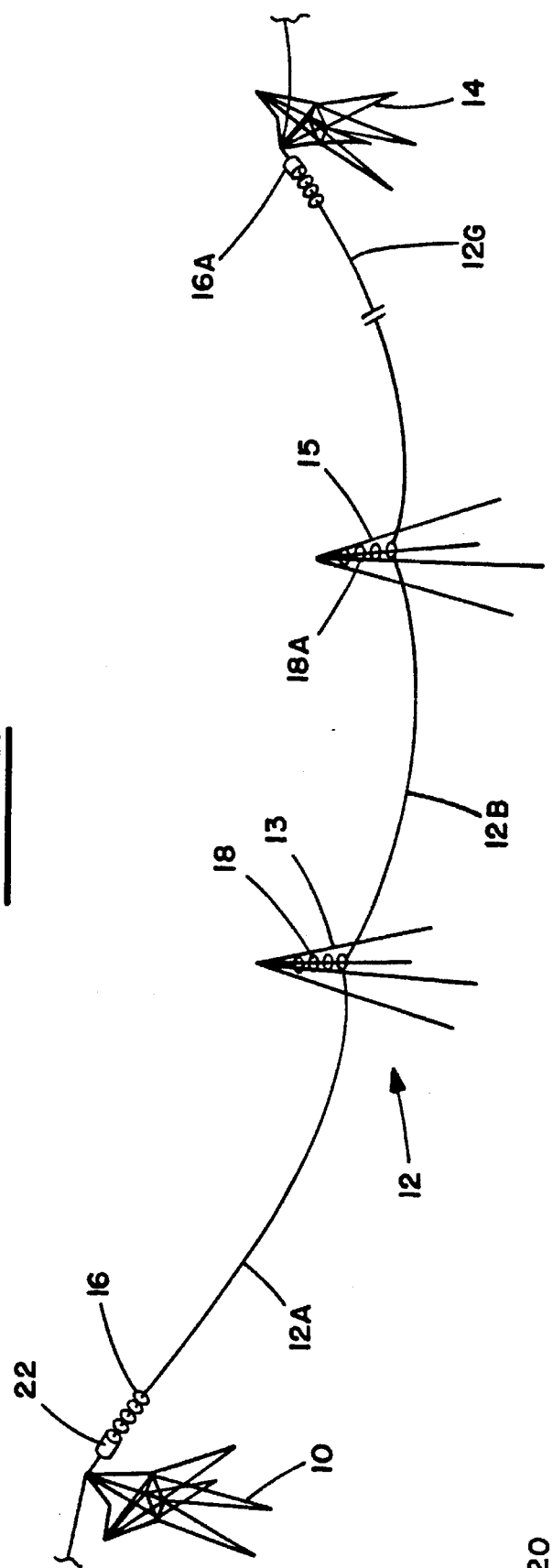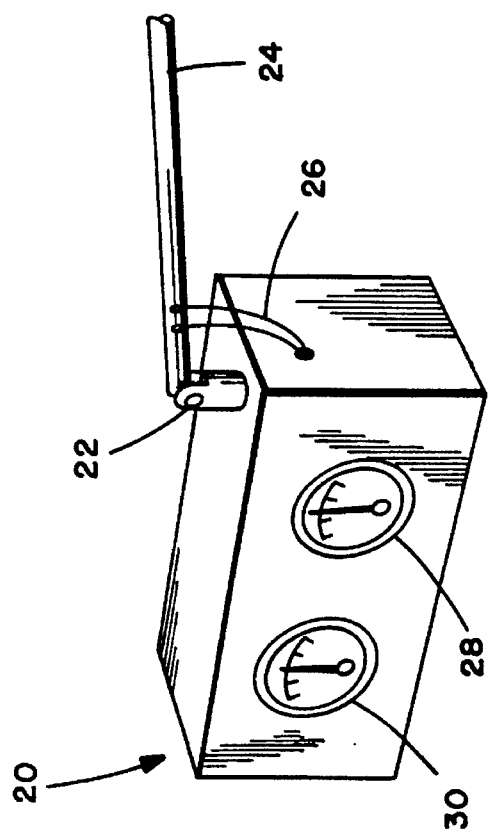
FIG. 2.
FIG. 3.

NET RADIATION SENSOR

BACKGROUND OF THE INVENTION

1. Field of the Invention

This invention relates to a system for monitoring the transmission capability of electrical transmission lines. The transmission capability of power lines will vary with the temperature of the line because the current carrying capacity is limited by the allowable sag of the line between transmission towers. In order to adequately control the load on a line it is necessary to know the condition of the line in terms of the sags of its spans. The present invention provides a system for determining maximum permissable power line current.

2. Description of the Prior Art

A major problem in overhead power transmission lines is that of clearance between the line and the nearest point on earth. If the line becomes too close to the earth or adjacent structures, problems can rise from electric flashover from the power line which can cause extensive electrical damage. For this and other reasons it is necessary to limit the current of these transmission lines so than any undue sag may be prevented. The major cause of increased sag is that of heating of the line. As the temperature increases the power line expands and clearance problems arise.

The heating of the line results from various sources. One cause is the heat that is generated in the conductor by the electrical current flowing through it which causes $I^2R$ heating in the conductor. Thus, as the current in the line increases there is a greater generation of heat with the resulting increase in line sag. Line heating is also effected by solar heat and ambient temperature in the surrounding area. This heating of the line is offset by the cooling effect of wind passing over the line and heat radiated from the conductor.

Traditionally, transmission lines were rated based on an assumed combination of worst cooling conditions, consisting of a combination of expected highest ambient temperature, solar radiation, and low speed. Such traditional current ratings were highly conservative. To take advantage of this conservatism, methods have been developed to either monitor some of the cooling conditions or the actual temperature of the conductor and to adjust current ratings and on such monitored data.

In the prior art, a number of methods have been used for determining line temperature. A first such method is that of theoretical calculation. Assumptions are made of wind speed and direction, ambient temperature and solar radiation and calculations are made for arriving at the line condition. Because the calculations are based on theoretical assumptions, the result can be at considerable variance from the actual line condition which might permit greater line current than exists or on the other hand, dictate a lower actual line current.

In some instances, weather stations have been established in the general location of the transmission linen in order to monitor the weather to thus provide somewhat more reliable data that is then used to calculate the line conditions including the temperature of the line. A third method for monitoring the line known to the prior art, is to provide sensor devices mounted on the conductor along the length of the line at various intervals to measure conductor temperatures from which load capacity can be determined. These various systems of the prior art are disclosed, for example, in U.S. Pat. Nos. 4,268,818 and 4,420,752, and 4,806,855. These later monitors have been somewhat more effective in identifying actual temperatures of the conductors.

Additional systems are disclosed in applicant's U.S. Pat. No. 5,235,861 and pending applications Ser. No. 08/251, 242, filed May 30, 1994.

SUMMARY OF THE INVENTION

The present invention is based upon the fact that the net affect of solar radiation on a conductor's temperature is substantially independent of the current in the conductor.

Accordingly, applicant provides a replica of the conductor under consideration which has the same cross-section, heat capacity, and heat emissivity as the conductor. Further, the replica is oriented in the same direction as the transmission conductor and located in the same area thereof. The temperature of the replica along with the area ambient temperature are measured and through appropriate calculations the ampacity calculation is made to determine the maximum permitted current through the transmission conductor under the particular weather conditions.

Thus, a primary object of the present invention is to determine the maximum permitted current in a transmission power line without measuring the temperature of the transmission line directly.

Another object of the present invention is to provide a system for determining the net effect of solar radiation on a particular power transmission line by the employment of a small replica thereof.

A further object of the present invention is to provide a method and apparatus for determining solar effect on a transmission line for the purpose of determining the maximum current under particular weather conditions by employing a replica of the line and measuring the temperature conditions at the replica.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein which:

FIG. 2 is a portion of a transmission line suspension system; and

FIG. 3 is schematic of the apparatus of the present invention.

DESCRIPTION OF A PREFERRED EMBODIMENT

Figure 1:
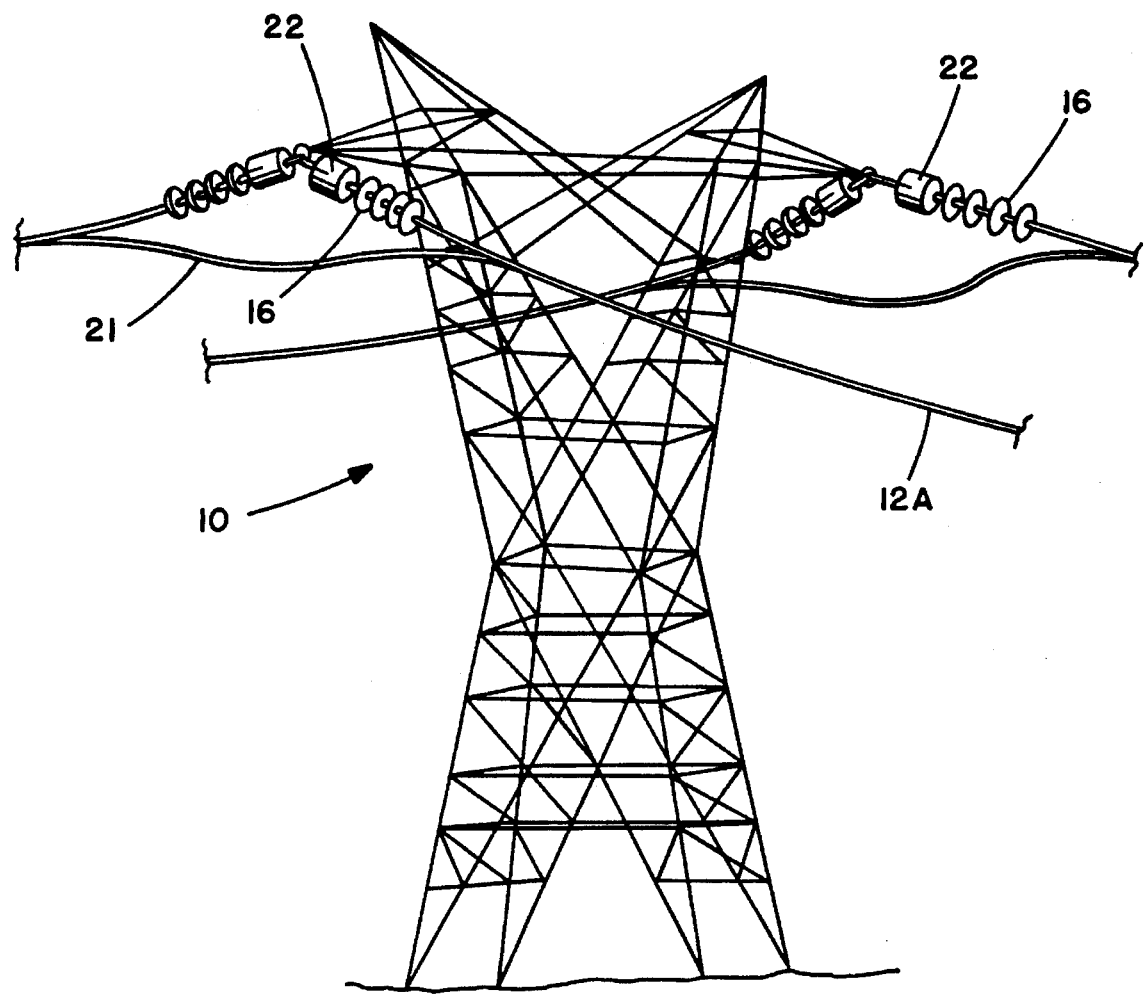
FIG. 1 is a view of a transmission tower having electric power transmission lines.

An overhead transmission power line comprises a series of transmission towers having spans of transmission line between adjacent towers is customarily designated a span and a series of such spans make up a suspension section. Each end of a suspension section is secured to a tower by a strain insulator structure which is subject to the full tension of the line connected to it. The individual suspension spans on the other hand, terminate at their respective towers by suspension insulator strings which permit significant longitudinal movement of the ends of the suspension spans.

Referring now to FIGS. 1 and 2, 10 indicates a transmission tower that terminates a suspension section of a power transmission line generally indicated by 12. The section is made up of a number of suspension spans 12A, 23B, to 12G which terminates at its tower 14. The terminal ends of the section are secured to their respective towers 10 and 14 through strain insulator strings, also known as dead end strings 16 and 16A. The intermediate suspension spans are secured to their respective towers by suspension strings in such a manner that the ends of the spans may move laterally and longitudinally.

For example, span 12B is secured at its end to suspension strings 18 and 18A which are suspended in a vertical manner to their respective towers represented diagramically, as 13, 15. Thus the strain structures 16, 16A are subject to the full tension of the line. Because the suspension strings 18, 18A hang from their respective towers permiting longitudinal movement of the end of the sections, the horizontal tension equalizes and is substantially constant throughout the suspension section.

As the temperature varies, the powerline will expand or contract. Excessive expansion or sag can result in the line's flashover to the closest point on earth. This is prevented by reducing the line current to reduce the $I^2R$ heating.

Transmission line ampacity $I_{max}$ is the largest current that can be carried under given environmental conditions without exceeding the t of the conductor. Under normal steady state conditions the transmission line conductor operates in a state of thermal energy balance and the steady state capacity is determined by the equation:

$$I_{max} = \sqrt{(q_c + q_r - q_s)/R(t)}$$

$q_c$=convective heat loss $q_r$=radiated heat loss $q_s$=heat gain from solar radiation This relationship is well known and found in IEEE-ANSI Standard, 738–1993.

It has been found that the net effect of solar radiation on the conductor's temperature is substantially independent of the line current. Thus it is not necessary to measure the solar effect on the actual transmission power line that is carrying current thereby removing $q_s$ from the above equation for $I_{max}$, but rather the same solar effect can be determined by use of a replica of a portion of a transmission line that need not be carrying any current. The replica may be a short section of the power line having approximately the same cross section, heat capacity and heat emissivity and absorptivity and oriented in the same general direction as the transmission line under consideration.

The temperature of the replica $t_s$ and the ambient temperature $t_a$ are measured and from these the net solar gain $t_n$ is calculated as $t_n = t_s - t_a$. Referring back to the formula for maximum capacity $$I_{max} = \sqrt{(q_c + q_{rl})/R(t)}$$

$q_{cl}$=convective heat loss of the replica portion transmission line $q_{rl}$=radiated heat loss of the replica portion transmission line whereby $q_{cl}$ is calculated using the IEEE/ANSI Standard except the temperature of the replica $t_s$ is substituted for the ambient temperature $t_a$ and whereby $q_{rl}$ is calculated using the average of ts and $t_a$. The IEEE/ANSI Standard is well known in the art and is known as IEEE Standard for Calculating the Current-temperature Relationship of Bare Overhead Conductors. IEEE Std 739–1993, New York, Nov. 8, 1993.

Thus it is seen that a replica of the transmission line may be used to determine the solar heating effect on the actual line and hence the maximum ampacity.

FIG. 3 shows the apparatus that may be used to effect the above method. Numeral 20 designates a cabinet having a ball and socket universal joint 22 to mount a replica section 24 of a power line. The replica is, of course, chosen to match the heat characteristics of the transmission line as above discussed. The unit 20 is located in the vicinity of the power line. Excellent results have been obtained with the unit 20 secured at the top of the tower as 10 alongside the powerline.

A suitable temperature sensor located in the replica 24 connects by wire 26 to a read out 28. The ambient temperature is similarly detected and read out is at 30.

If it is desirable to transmit the temperature information, the cabinet 20 may contain suitable electrical conversion and communication transmission apparatus as shown in applicant's Pat. No. 5,235,861.

Having thus described the invention with particular reference to the preferred forms thereof, it will be obvious that various changes and modifications may be made therein without departing from the spirit and scope of the invention as defined in the appended claims.

What is claimed is:

1. The method of determining the maximum designed current carrying capacity of an electrical power line conductor mounted between transmission towers providing a predetermined location and directional orientation under particular solar heating conditions in which $$I_{max} = \sqrt{(q_c + q_r - q_s)/R(t)} \text{ and}$$

$q_c$ is the convective heat loss $q_r$ is the radiation heat loss $q_s$ is the heat from solar radiation comprising:

the steps of providing a conductor section having substantially the same cross sectional area, heat capacity, and heat emissivity/absorptivity of the power line conductor;

locating the said conductor section in close proximity to the power line conductor;

orienting the said conductor section in a direction corresponding to the directional orientation of the power line conductor;

measuring the ambient temperature at the location of the conductor section;

measuring the temperature of the conductor section; and calculating the maximum current using the said ambient temperature and conductor temperature measurements.

2. The method set forth in claim 1 in which the conductor section is made of the same material as the power line conductor.

3. The method of determining the maximum designed current carrying capacity of an electric power line conductor under particular solar heating conditions comprising;

providing a sectional replica of the power line conductor having the same heating characteristics thereof;

locating the replica in the proximity of the power line conductor whereby the solar heating conditions of the replica and the power line conductor are substantially the same;

measuring the solar heating effect on the replica; and calculating the maximum design current carrying capacity of the power line conductor under the said particular solar heating conditions.

4. The method of claim 3 in which the step of measuring the solar heating effect on the replica comprises measuring the temperature of the replica and the ambient temperature of the replica.

5. The method of claim 4 in which the calculation of the designed current is made according to the formula:

$$I_{max} = \sqrt{(q_c + q_r - q_s)/R(t)}$$

in which $q_c$ is the convective heat loss $q_r$ is the radiation heat loss $q_s$ is the heat from solar radiation.

6. A portable device for monitoring the current carrying capacity of an electrical power line conductor comprising;

an enclosure;

a section of an overhead power line conductor;

said section being of the same material as the electrical power line being monitored;

mounting means to secure one end of said section to the enclosure;

said mounting means including swivel means to permit said section to be pivoted in three-dimensional space;

temperature measuring means connected to said section to measure the temperature thereof;

ambient temperature measuring means to measure the surrounding ambient temperature; and visually indicating means to display the temperature and ambient temperature.

7. The device set forth in claim 6 including means to transmit said temperature measurements and ambient temperature measurements to a location distant from said device.

* * * * *